(12) United States Patent (10) Patent No.: US 12,684,175 B2

Yin et al. (45) Date of Patent: Jul. 14, 2026

(54) METHOD, DEVICE, AND MEDIUM FOR VIDEO PROCESSING

(71) Applicants:Beijing Bytedance Network Technology Co., Ltd., Beijing (CN); Bytedance Inc., Los Angeles, CA (US)

(72) Inventors: Wenbin Yin, Beijing (CN); Li Zhang, Los Angeles, CA (US); Haibin Yin, Beijing (CN); Huade Shi, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 130 days.

(21) Appl. No.: 18/290,118

(22) PCT Filed: May 13, 2022

(86) PCT No.: PCT/CN2022/092785

§ 371 (c)(1),
(2) Date: Nov. 9, 2023

(87) PCT Pub. No.: WO2022/237899

PCT Pub. Date:Nov. 17, 2022

(65) Prior Publication Data

US 2024/0259607 A1      Aug. 1, 2024

(30) Foreign Application Priority Data

May 14, 2021    (WO) ................ PCT/CN2021/093802

(51) Int. Cl.
H04N 19/85      (2014.01)
H04N 19/105      (2014.01)
(Continued)

(52) U.S. Cl.
CPC ........... *H04N 19/85* (2014.11); *H04N 19/105* (2014.11); *H04N 19/117* (2014.11); (Continued)

(58) Field of Classification Search
CPC ........ H04N 19/46; H04N 19/59; H04N 19/30; H04N 19/117; H04N 19/132; H04N 19/85; H04N 19/119
See application file for complete search history.

(56) References Cited

U.S. PATENT DOCUMENTS

| | | | | |
|---|---|---|---|---|
| 11,627,328 B2 * | 4/2023 | Xu | ....................... | H04N 19/132 |
| | | | | 375/240.25 |
| 11,823,350 B2 * | 11/2023 | Yin | ........................ | H04N 19/14 |

(Continued)

FOREIGN PATENT DOCUMENTS

| | | |
|---|---|---|
| CN | 102318202 A | 1/2012 |
| CN | 108833918 A | 11/2018 |

(Continued)

OTHER PUBLICATIONS

Up-sampling with a fixed order in MIP; Liu; et al. (Year: 2019).*

(Continued)

*Primary Examiner* — Luis Perez-Fuentes
(74) *Attorney, Agent, or Firm* — Astute IP Law Group

(57) ABSTRACT

Embodiments of the present disclosure provide a solution for video processing. A method for video processing is proposed. The method comprises: determining, during a conversion between a current video part of a video and a bitstream of the video, a process applied to the current video part at least based on coding information of the current video part, the determined process comprises at least one of an upsampling process or an enhancement process; and performing the conversion based on the determined process. The method in accordance with the present disclosure (Continued)

improves the coding process of the current video unit. Compared with the conventional solution, the proposed method can advantageously improve the coding efficiency and an image/video of larger size with more pixels and better visual quality is achieved.

20 Claims, 9 Drawing Sheets

(51) Int. Cl.

| | |
|---|---|
| *H04N 19/117* | (2014.01) |
| *H04N 19/119* | (2014.01) |
| *H04N 19/132* | (2014.01) |
| *H04N 19/139* | (2014.01) |
| *H04N 19/172* | (2014.01) |
| *H04N 19/174* | (2014.01) |
| *H04N 19/30* | (2014.01) |
| *H04N 19/80* | (2014.01) |
| *H04N 19/96* | (2014.01) |

(52) U.S. Cl.
    CPC ......... *H04N 19/119* (2014.11); *H04N 19/132* (2014.11); *H04N 19/139* (2014.11); *H04N 19/172* (2014.11); *H04N 19/174* (2014.11); *H04N 19/30* (2014.11); *H04N 19/80* (2014.11); *H04N 19/96* (2014.11)

(56) References Cited

U.S. PATENT DOCUMENTS

| | | | |
|---|---|---|---|
| 2018/0007362 A1 | 1/2018 | Krishnan | |
| 2021/0092479 A1* | 3/2021 | Namba | G06V 10/764 |
| 2021/0136395 A1 | 5/2021 | Jun et al. | |

FOREIGN PATENT DOCUMENTS

| | | |
|---|---|---|
| CN | 111010568 A | 4/2020 |
| JP | 2005253092 A | 9/2005 |
| WO | 2019011046 A1 | 1/2019 |

OTHER PUBLICATIONS

Up-sampling with a fixed order in MIP; Liu; et al.—2019. (Year: 2019).*

International Search Report in PCT/CN2022/092785, mailed Aug. 10, 2022, 3 pages.

Liu et al., "CE3-3: Up-sampling with a fixed order in MIP," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0054, 5 pages.

Office Action for Chinese Patent Application No. 202280033705.6, mailed on Apr. 30, 2026, 13 pages.

* cited by examiner

900

902

DETERMINE, DURING CONVERSION BETWEEN CURRENT VIDEO PART OF VIDEO AND BITSTREAM OF VIDEO, PROCESS APPLIED TO CURRENT VIDEO PART AT LEAST BASED ON CODING INFORMATION OF CURRENT VIDEO PART

904

PERFORM CONVERSION BASED ON DETERMINED PROCESS

METHOD, DEVICE, AND MEDIUM FOR VIDEO PROCESSING

CROSS-REFERENCE TO RELATED APPLICATIONS

This is a national stage application filed under 37 U.S.C. 371 based on International Patent Application No. PCT/CN2022/092785, filed May 13, 2022, which claims priority to International Patent Application No. PCT/CN2021/093802 filed with the China National Intellectual Property Administration (CNIPA) on May 14, 2021, the disclosures of which are incorporated herein by reference in its entirety their entireties.

FIELD

Embodiments of the present disclosure relates generally to video coding techniques, and more particularly, to super resolution technologies of images and/or videos.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. For consumer applications such as video conference, web browsing, vehicle navigation and the like, super resolution technologies of images and/or videos are especially expected.

SUMMARY

Embodiments of the present disclosure provide a solution for video processing.

In a first aspect, a method for video processing is proposed. The method comprises: determining, during a conversion between a current video part of a video and a bitstream of the video, a process applied to the current video part at least based on coding information of the current video part, the determined process comprises at least one of an upsampling process or an enhancement process; and performing the conversion based on the determined process. The method of the first aspect in accordance with the present disclosure improves the coding process of the current video unit. Compared with the conventional solution, the proposed method can advantageously improve the coding efficiency and an image/video of larger size with more pixels and better visual quality is achieved.

In a second aspect, an apparatus for video processing is proposed. The apparatus comprises a processor and a non-transitory memory coupled to the processor and having instructions stored thereon, wherein the instructions upon execution by the processor, cause the processor to: determine, during a conversion between a current video part of a video and a bitstream of the video, a process applied to the current video part at least based on coding information of the current video part, the determined process comprises at least one of an upsampling process or an enhancement process; and perform the conversion based on the determined process.

In a third aspect, a non-transitory computer-readable storage medium is proposed. The non-transitory computer-readable storage medium storing instructions that cause a processor to perform a method in accordance with the first aspect of the present disclosure.

In a fourth aspect, a non-transitory computer-readable recording medium is proposed. The non-transitory computer-readable recording medium storing a bitstream of a video which is generated by a method performed by an apparatus for video processing, wherein the method comprises: determining a process applied to a current video part of the video at least based on coding information of the current video part, the determined process comprises at least one of an upsampling process or an enhancement process; and generating the bitstream based on the determined process.

In a fifth aspect, a method for storing a bitstream of a video is proposed. The method comprises: determining a process applied to a current video part of the video at least based on coding information of the current video part, the determined process comprises at least one of an upsampling process or an enhancement process; generating the bitstream based on the determined process; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
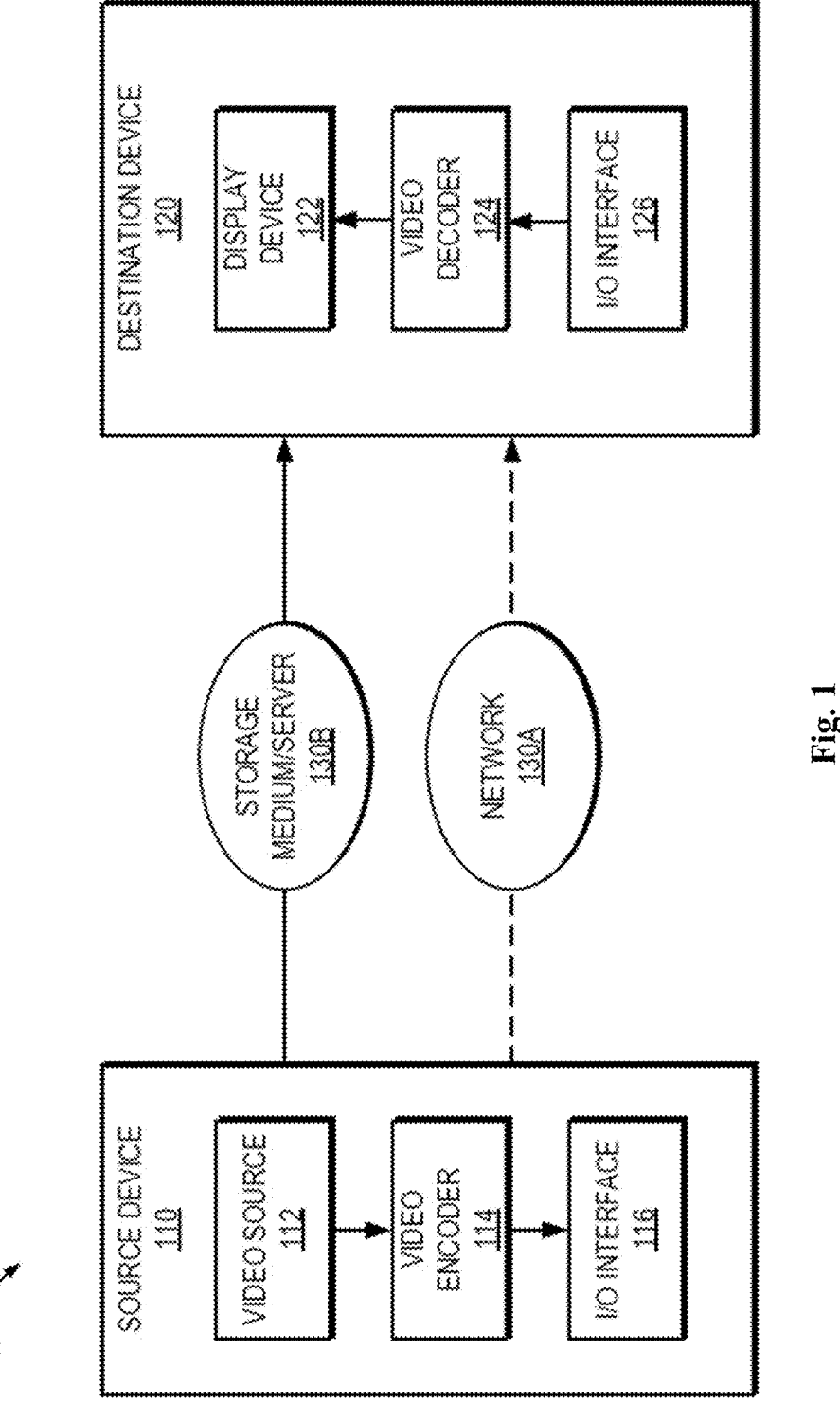
FIG. 1 illustrates a block diagram of an example video coding system in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to the destination device 120 via the I/O interface 116 through a network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or future standards.

Figure 2:
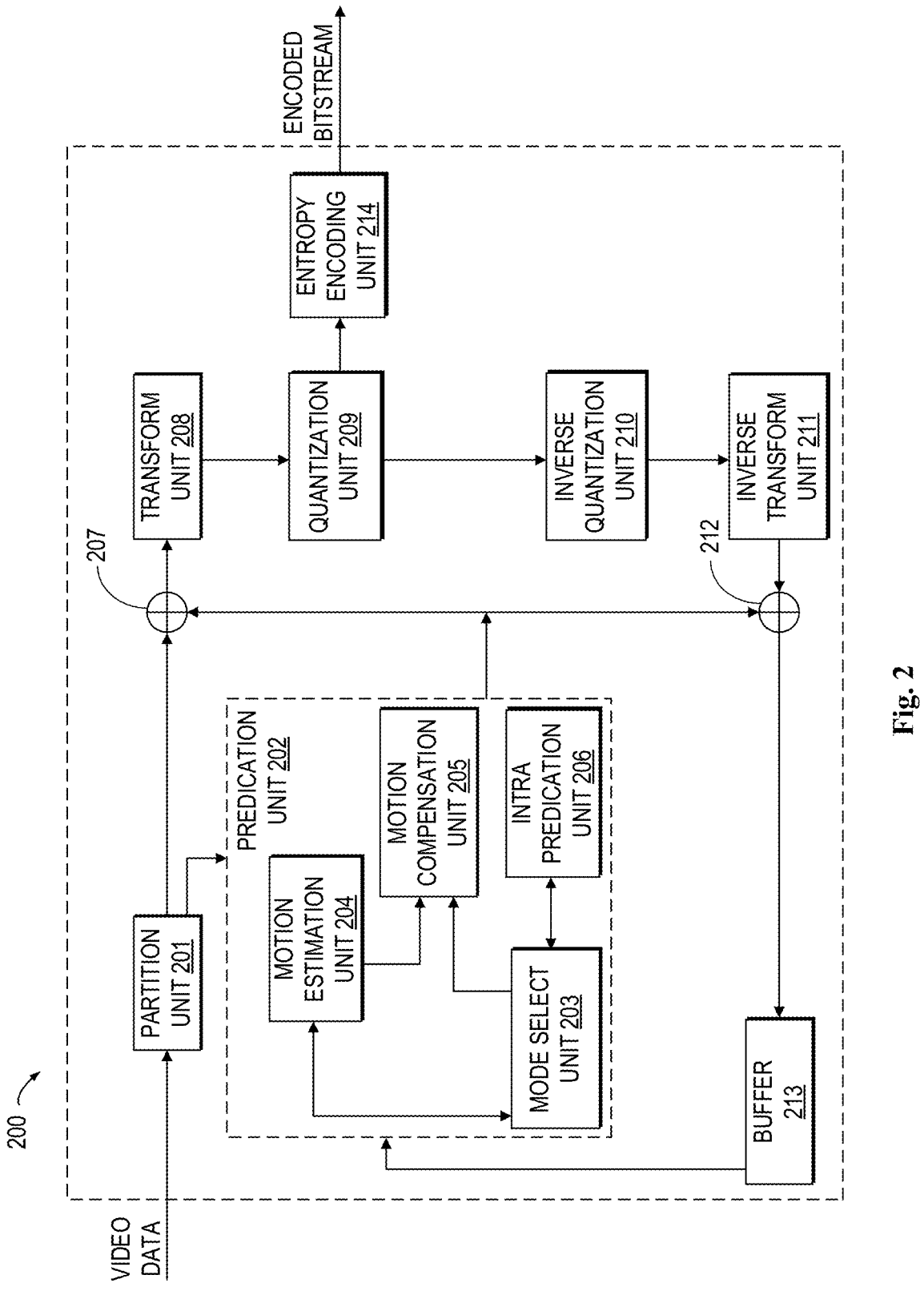
FIG. 2 illustrates a block diagram of an example video encoder in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a predication unit 202 which may include a mode selection unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the predication unit 202 may include an intra block copy (IBC) unit. The IBC unit may perform predication in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and a video decoder 300 (which will be discussed in detail below) may support various video block sizes.

The mode selection unit 203 may select one of the coding modes, intra or inter, e.g., based on error results, and provide the resulting intra-coded or inter-coded block to the residual generation unit 207 to generate residual block data and to the reconstruction unit 212 to reconstruct the encoded block for use as a reference picture. In some examples, the mode selection unit 203 may select a combination of intra and inter predication (CIIP) mode in which the predication is based on an inter predication signal and an intra predication signal. The mode selection unit 203 may also select a resolution for a motion vector (e.g., a sub-pixel or integer pixel precision) for the block in the case of inter-predication.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, the video encoder 200 may predictively signal the motion vector. Two examples of predictive signaling techniques that may be implemented by the video encoder 200 include advanced motion vector predication (AMVP) and merge mode signaling.

The intra prediction unit 206 may perform intra prediction on the current video block. When performing intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block (s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform unit 208 may generate one or more transform coefficient video blocks for the current video block by applying one or more transforms to a residual video block associated with the current video block.

After the transform unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the predication unit 202 to produce a reconstructed video block associated with the current video block for storage in the buffer 213.

After the reconstruction unit 212 reconstructs the video block, a loop filtering operation may be performed to reduce video blocking artifacts in the video block.

The entropy encoding unit 214 may receive data from other functional components of the video encoder 200. When the data is received, the entropy encoding unit 214 may perform one or more entropy encoding operations to generate entropy encoded data and output a bitstream that includes the entropy encoded data.

Figure 3:
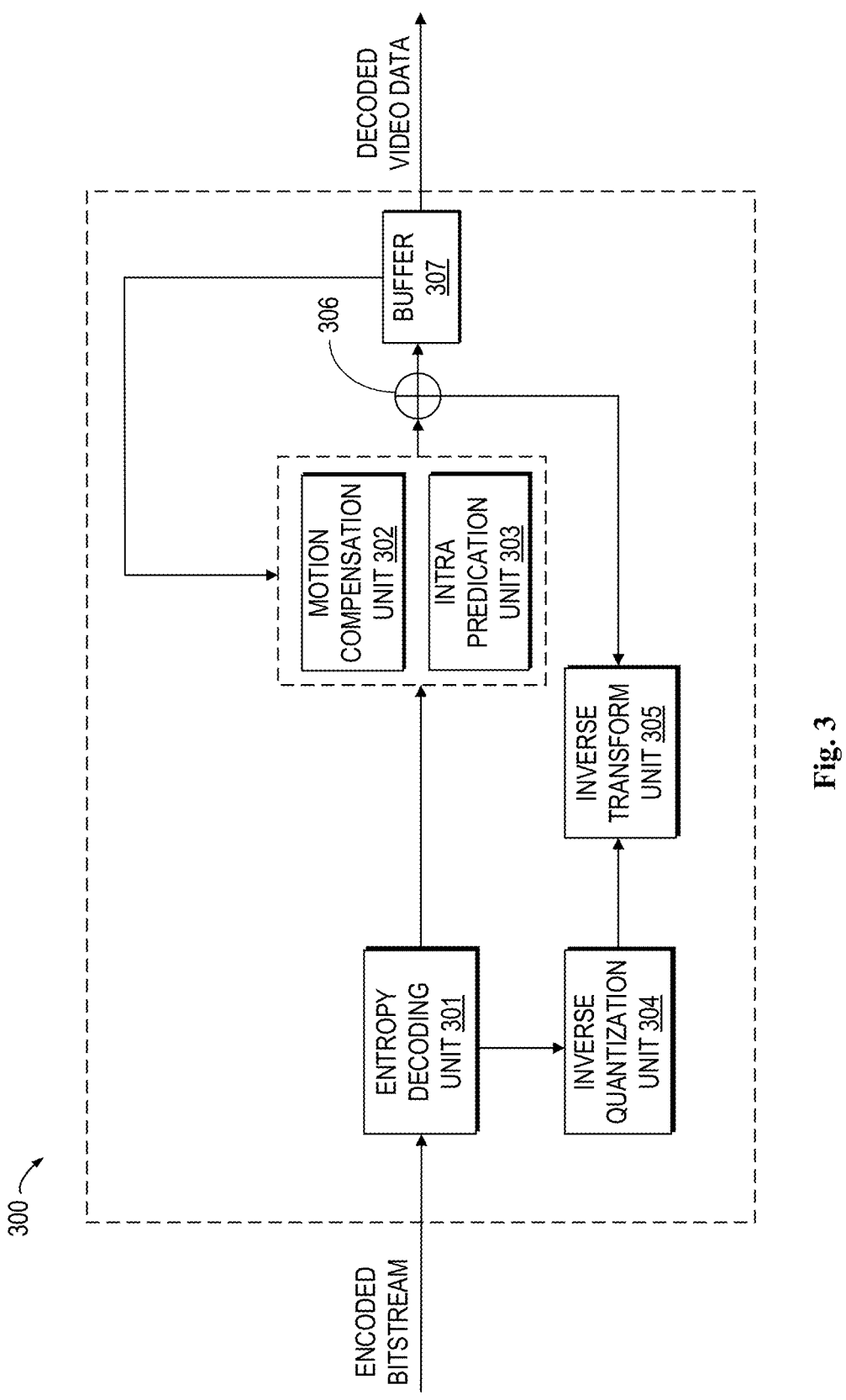
FIG. 3 illustrates a block diagram of an example video decoder in accordance with some embodiments of the present disclosure.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transform unit 305, a reconstruction unit 306, and a buffer 307. The video decoder 300 may, in some examples, perform a decoding pass that is generally reciprocal to the encoding pass as described with respect to the video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes, which, for example, are received in the bitstream, to form a prediction block from spatially adjacent blocks. The inverse quantization unit 304 inverse quantizes, i.e., de-quantizes, the quantized video block coefficients provided in the bitstream and decoded by the entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra predication and also produces decoded video for presentation on a display device.

Some example embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. SUMMARY

This disclosure is related to image and video super resolution technologies. Specifically, it is about produce an image/video of larger size with more pixels and better visual quality, especially for screen content images/videos which are becoming more and more popular in numerous consumer applications such as video conference, web browsing, vehicle navigation and more.

2. ABBREVIATIONS

SISR Single Image Super Resolution
SCI Screen Content Image
HR High Resolution
LR Low Resolution
SRCNN Convolutional Neural Network based Super Resolution SR Sparse Representation
ANR Anchored Neighbourhood Regression
CNN Convolutional Neural Network
DoG Difference of Gaussian
RAISR Rapid and Accurate Image Super Resolution
SVD Singular Value Decomposition
OTD Orthogonal-Triangular Decomposition
MV Motion Vector
IBC Intra Block Copy
BV Block Vector
USM Unsharp Mask
LoG Laplacian of Gaussian
CU Coding Unit
CTU Coding Tree Unit
VVC Versatile Video Coding
QP Quantization Parameter

3. BACKGROUND

3.1. Image Super-Resolution

Image super resolution is the process of estimating a high-resolution image from a low-resolution input image. The input image could be treated as measurements of high-resolution image and the goal of SISR is to recover the unknown pixels from these known measurements. Note that the degradation model may be linear (e.g., blur) or non-linear (e.g., compression) in our daily life scenarios. The methods for solve SISR problem could be roughly divided into three categories: interpolation-based methods, recon-struction-based methods, and learning-based methods.

The interpolators are basic methods for solving the image super resolution problem. The most common interpolation methods are nearest, bilinear and bicubic. Interpolation-based methods are widely used since they are easy to imply and low computational cost. However, this kind of methods are limited in recover rich textures and obvious edges since they are not adaptive to the image content.

The reconstruction-based methods typically enforce a reconstruction constrain. The high-resolution image is reconstructed from a low-resolution image sequence. Although the generated high-resolution image meets the reconstruction constrain, the smoothness and texture com-pleteness may not be guaranteed.

The basic idea of learning-based methods is to learn a mapping from LR patches to their HR versions based on a pre-papered training data set. The training data set usually contains LR-HR patch pairs. Typically, a compact represen-tation over dictionary elements and coefficients is learned for both LR and HR patches. The corresponding coefficients of input patch is combined with dictionary elements to produce the HR patch. The CNN based methods are becom-ing more and more popular in recent years. They learn an end-to-end mapping form LR images to HR images and the dictionary elements are replaced by hidden convolutional layers.

3.2. Image Restoration

Image restoration refers to the genre of techniques that aim to recover a high-quality original image from a degraded version of that image given a specific model for the degradation process. For modern applications such as video conference and online teaching, the degradation model com-monly related to down-scaled sampling, compression (en-coding and decoding) and upscaled sampling. The two most common forms of degradation an image suffers are loss of sharpness or blur, and additional noise.

The purpose of image denoising in image restoration is to reduce the noise by using a smoothing filter. The Gaussian filter is the most commonly used smooth filter. It is widely used effect in graphics software, typically to reduce image noise and remove detail. The visual effect of this blurring technique is a smooth blur resembling that of viewing the image through a translucent screen, distinctly different from the bokeh effect produced by an out-of-focus lens or the shadow of an object under usual illumination. Mathemati-cally, applying a Gaussian blur to an image is the same as convolving the image with a Gaussian function. In two dimensions, it is the product of two Gaussian function, one in each dimension:

$$G(x, y) = \frac{1}{2\pi\sigma^2} e^{-\frac{x^2+y^2}{2\sigma^2}}$$

where x is the distance from the origin in the horizontal axis, y is the distance from the origin in the vertical axis, and $\sigma$ is the standard deviation of the Gaussian distribution. It could be treated as a low-pass filter to smooth the image/video.

Bilateral image filter is a nonlinear filter that smooths the noise while preserving edge structures. The bilateral filtering is a technique to make the filter weights decrease not only with the distance between the samples but also with increas-ing difference in intensity. This way, over-smoothing of edges can be ameliorated. A weight is defined as $$w(\Delta x, \Delta y, \Delta I) = e^{-\frac{\Delta x^2+\Delta y^2}{2\sigma_d^2} - \frac{\Delta I^2}{2\sigma_r^2}}$$

where $\Delta x$ and $\Delta y$ is the distance in the vertical and horizontal and $\Delta I$ is the difference in intensity between the samples. The edge-preserving de-noising bilateral filter adopts a low-pass Gaussian filter for both the domain filter and the range filter. The domain low-pass Gaussian filter gives higher weight to pixels that are spatially close to the center pixel. The range low-pass Gaussian filter gives higher weight to pixels that are similar to the center pixel. Com-bining the range filter and the domain filter, a bilateral filter at an edge pixel becomes an elongated Gaussian filter that is oriented along the edge and is greatly reduced in gradient direction. This is the reason why the bilateral filter can smooth the noise while preserving edge structures.

Guided Image Filter (GIF) is a global optimization image filter for edge-persevering image smoothing and image detail enhancement. Derived from a local linear model, the guided filter computes the filtering output by considering the content of a guidance image, which can be the input image itself or another different image. The guided filter can be used as an edge-preserving smoothing operator like the popular bilateral filter, but it has better behaviors near edges. The guided filter is also a more generic concept beyond smoothing: It can transfer the structures of the guidance image to the filtering output, enabling new filtering appli-cations like dehazing and guided feathering. Moreover, the guided filter naturally has a fast and non-approximate linear time algorithm, regardless of the kernel size and the intensity range. The guided filter is both effective and efficient in a great variety of computer vision and computer graphics applications, including edge-aware smoothing, detail enhancement, HDR compression, image matting/feathering, dehazing, joint upsampling, etc.

The purpose of image sharpness enhancement in image restoration is to sharpens an image by enhancing the high-frequency components.

Figure 4:
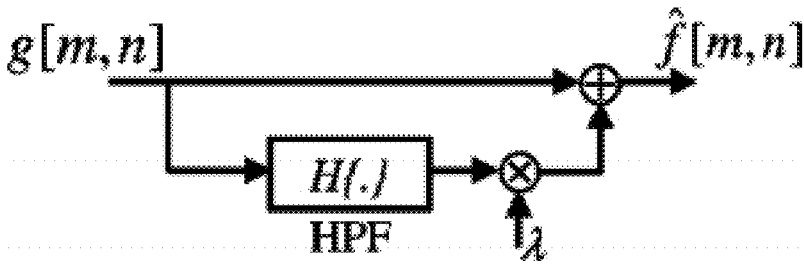
FIG. 4 is a schematic diagram illustrating a block diagram of the unsharp mask filter.

The unsharp masking (USM) filter is one of the most commonly used image sharpening method. It has a very low-cost computational structure. The unsharp mask filter is a linear filtering method which achieves sharpening by adding a fraction of the high-frequency content of the input image back to that image. The block diagram of the unsharp mask filter is shown in FIG. 4. In a formulation way, the USM could be described as:

$$\hat{f}[m, n] = g[m, n] + \lambda \mathcal{H}\{g[m, n]\} = g[m, n] + \lambda(g[m, n] - \mathcal{L}\{g[m, n]\})$$

where $\mathcal{H}\{\bullet\}$ stands for a high-pass filter and $\mathcal{L}\{\bullet\}$ means a low-pass filter, g[m,n] stands for the sample located at position [m,n] and $\hat{f}[m,n]$ stands for the updated sample located at position [m,n].

3.3. Video Codec

Figure 5:
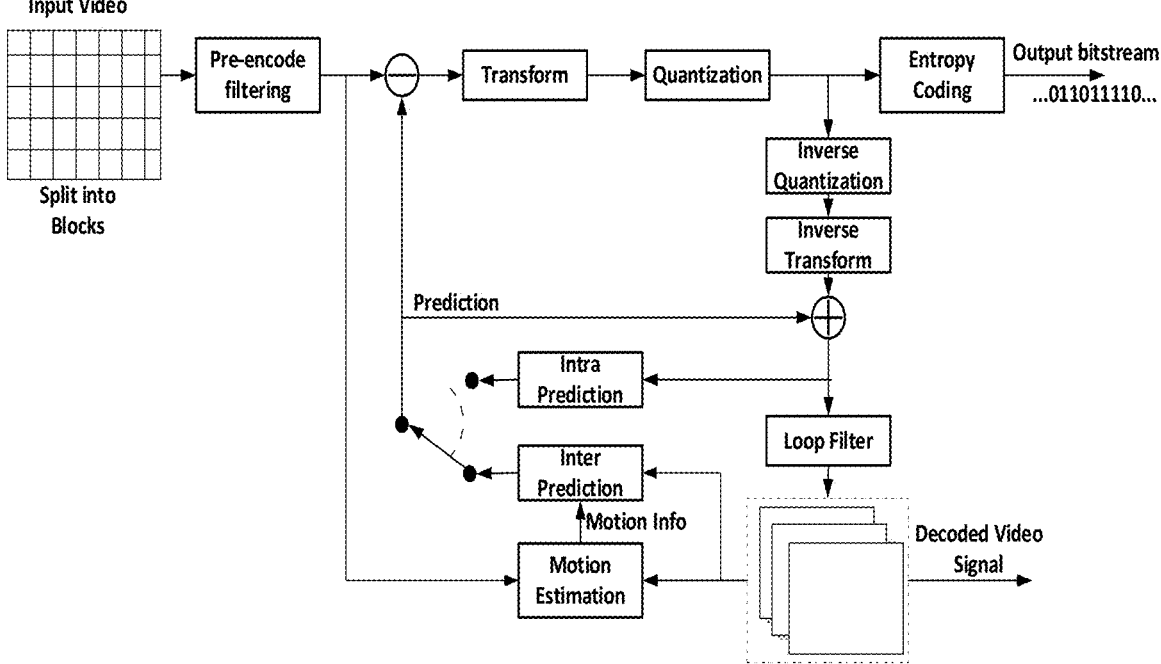
FIG. 5 is a schematic diagram illustrating a general block diagram of video codec.

Video compression is an indispensable and efficient way to reduce the redundancy of multimedia data, which has been becoming increasingly important in saving data-storage space and total data-transmission costs. Video codec commonly has a block-based hybrid coding architecture, combining inter-picture and intra-picture prediction and transform coding with entropy coding as shown in FIG. 5.

3.4. Screen Content Images/Videos

In our daily life, screen content pictures have become quite common over recent years. Many emerging applications such as online gaming, mobile web browsing, video conference and online teaching are involved the computer-generated screen content images. Different from natural images/videos generated by cameras, screen content images/videos are generated or rendered by computers, mobile phones or other electronic devices. The screen content images/videos usually contain test, artificial backgrounds and graphics, which leads to sharp edges and frequent transitions. During the screen sharing process, the multiple clients may use devices with different resolution. Additionally, the screen content images and videos are usually coded in a downscaled size to save the transmitting and coding cost. Therefore, the scale method, especially super resolution with sharpness enhancement method for screen content videos is urgently required.

4. PROBLEMS

The existing design for linear interpolation has the following problems when being applied to upsampling screen content images/videos:

1. They are optimized for camera captured images/videos, while features of screen content images are not considered.
2. The output videos commonly contain blur or loss of sharpness.
3. The local and non-local information are not utilized.
4. Information from coded bitstreams is not utilized.

5. EMBODIMENTS OF THE PRESENT DISCLOSURE

To solve the above problems and some other problems not mentioned, methods as summarized below are disclosed. The present disclosure should be considered as examples to explain the general concepts and should not be interpreted in a narrow way. Furthermore, the present disclosure can be applied individually or combined in any manner.

In the present disclosure, a method called fast super resolution with refinement/sharpness enhancement is proposed wherein (e.g., a mask generation is introduced in the refinement/sharpness enhancement process for the determination) whether to apply refinement/sharpness enhancement or not to upsampled samples is determined on-the-fly.

The proposed refinement (or sharpness enhancement) solution could be applied individually or combined with any image upscaling methods, including linear method such as Lanczos interpolation, Bilinear interpolation, Bicubic interpolation and non-linear method such as compressive sensing based and neural-network based methods.

Furthermore, the proposed idea could be combined with any video codecs to provide high-resolution and high-quality screen content video. In yet another example, the proposed method may be applied during the encoding/decoding process wherein a certain area within a picture may be unsampled by the proposed method.

Figure 6:
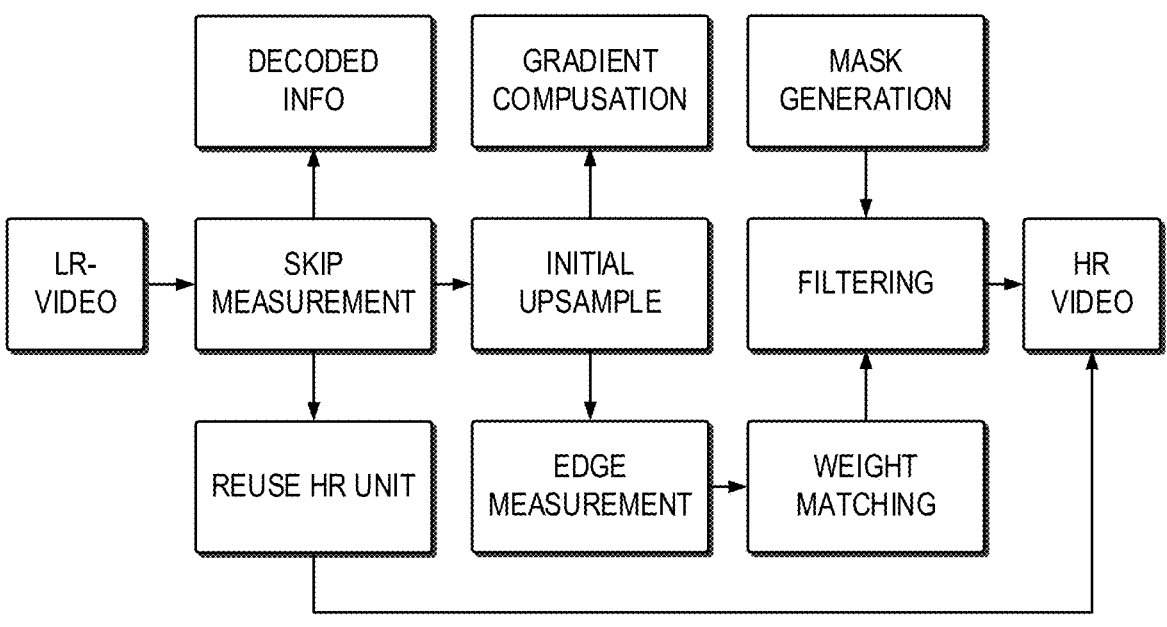
FIG. 6 is a schematic diagram illustrating an overflow of post-processing in accordance with some embodiments of the present disclosure.

1) For samples within a given region, whether to apply a refinement/sharpness enhancement process (e.g., additional refinement to upsampled sample values) may be determined on-the-fly (e.g., according to a mask).

a. In one example, the determination may be dependent on coded/decoded information, such as skip mode or not, whether there are non-zero transform coefficients.

b. In one example, the determination may be dependent on the sample values before upsampling or after upsampling.

i. In one example, the sample values are those located within a given window containing the current sample to be refined/enhanced.

c. In one example, the refinement/sharpness enhancement is achieved based on the USM architecture while multiple modifications to each step in the USM process have been applied. An example of the proposed method process is depicted in FIG. 6.

d. The idea utilizes an initial interpolation method to generate a high-resolution image/video and further enhances the high-resolution image/video by a refinement/sharpness enhancement scheme. The refinement/sharpness enhancement scheme uses a low-pass or high-pass filter to generate the high-frequency content and utilizes a weight to enhance the high-frequency content in the high-resolution image/video. Specifically, the scheme classifies the input pixel/sample into multiple groups/classes and utilizes a training dataset which contains degraded image and original ground truth image pairs to learn a specific weight/parameter for each group/class. The proposed idea can produce a high-resolution sharpness enhanced image/video with more details and less artifacts when input a low-resolution image/video.

2) On the initial upsampling process a. In one example, Lanczos interpolation may be used for initial upsampling.

b. Alternatively, bicubic algorithm is utilized in the initial upsampling process.

c. Alternatively, bilinear algorithm is utilized in the initial upsampling process.

d. Alternatively, the nearest-neighbor interpolation algorithm is utilized in the initial upsampling process.

e. Alternatively, other linear or non-linear super resolution methods may be used for initial upsampling.

3) On gradient computation a. Horizontal and/or vertical gradients for a video unit (e.g., per M*N sample/pixels wherein M and N are integers) are calculated in the gradient initialization process.

i. Alternatively, furthermore, diagonal gradients (e.g., 45-degree and/or 135-degree) are calculated.

a) In one example, the 45-degree gradient is defined as:

Sum of the difference between current video unit and its corresponding right-top video unit and the difference between current video unit and its corresponding left-bottom video unit.

b) In one example, the 135-degree gradient is defined as:

Sum of the difference between current video unit and its corresponding left-top video unit and the difference between current video unit and its corresponding right-bottom video unit.

ii. In one example, M and N are both equal to 1.

iii. In one example, either M or N is greater than 1.

a) Alternatively, furthermore, for each video unit, gradient information of each samples/pixels within the video unit may be calculated and used.

b) Alternatively, furthermore, for each video unit, gradient information of selective K (K<M*N) samples/pixels within the video unit may be calculated and used.

c) In one example, gradient information for each sample/pixel within the selective K samples/pixels (denoted by tempG) may be firstly calculated and the final gradient information for the video unit may be based on the calculated tempG, e.g., averaged sum of tempG.

iv. In one example, the gradient information of samples which are out of picture boundary are calculated by padding the boundary samples.

a) In one example, the boundary samples of the video unit may be padded by a mirroring function.

b) In one example, the boundary samples of the video unit may be padded by a extending function.

b. In one example, the gradients of each video units are further refined, such as using the average of gradient information directly.

i. In one example, the average of gradients for each direction (e.g., hor/ver/diagonal) for all video units within a K*L sub-region is calculated and used as the refined gradient for all samples within the K*L sub-region.

c. In above examples, at least one of M, N, X, Y, K, L and T may be pre-defined or adaptively changed (e.g., according to scaling factors/resolution/decoded information) or signaled.

4) On MASK generation a. In one example, a MASK generation process is invoked which is based on the initialized/refined gradients of a video unit containing one or multiple samples/pixels.

i. In one example, for a processing unit (e.g., X*Y sample/pixels), the same mask value is shared.

a) In one example, a mask value is calculated once for the processing unit.

b) In one example, the mask is defined as:

a. The mask value is set to 1 when both diagonal gradients are less a threshold value T.

b. The mask value is set to 1 when both horizontal and vertical gradients are less than a threshold value T.

c. Otherwise, the mask value is set to 0.

b. In one example, the processing unit is the same as the video unit for gradient calculation, i.e., X=M, and Y=N.

c. In one example, the processing unit is greater than the video unit for gradient calculation, i.e., X*Y>M*N.

a) In one example, a mask value is calculated once for the processing unit.

b) In one example, the mask is calculated based on gradients of one or multiple video units.

d. In one example, the MASK may be derived according to the coded/decoded information, e.g., whether the block is coded with skip mode, or whether there are no non-zero transform coefficients.

e. In one example, the MASK information may be utilized to determine whether to perform the refinement/sharpness enhancement process or not.

5) On edge strength measurement a. In one example, samples inside a video unit may be classified into $N_{class}$ classes (e.g., $N_{class}$=64).

i. In one example, samples inside a video unit may be classified into multiple classes by an edge strength measurement method.

a) In one example, the edge strength measurement method may be the LoG operator.

b) In one example, the edge strength measurement method may be the DoG operator.

c) In one example, the edge strength measurement method may be a gradient based operator.

d) In one example, the edge strength measurement method may be an edge detection method.

ii. In one example, a fixed threshold value $T_{class}$ may be used to compute the class index of the sample based on LoG value, DoG value or other edge strength measurement methods as follows:

$$\text{index}_{sample} = \lfloor \text{info}_{sample}/T_{class} \rfloor$$

where $0 \leq \text{index}_{sample} < N_{class}$ and $\text{info}_{sample}$ stands for the corresponding edge strength measurement information.

iii. In one example, a set of threshold value $$\left[ T_{class_1}, T_{class_2}, \cdots, T_{class_{N_{class}-1}} \right]$$

may be used to classify the samples inside a video unit based on LoG value, DoG value or other edge strength measurement methods as follows:

$$\text{index}_{sampe} = 0 \quad \text{when} \ \left(0 \leq \text{info}_{sample} < T_{class_1}\right)$$

$$\text{index}_{sample} = 1 \quad \text{when} \ \left(T_{class_1} \leq \text{info}_{sample} < T_{class_2}\right)$$

$$\cdots$$

-continued $$\text{index}_{sample} = N_{class} - 2 \text{ when } \left(T_{class_{N_{class}-2}} \leq \text{info}_{sample} < T_{class_{N_{class}-1}}\right)$$

$$\text{index}_{sample} = N_{class} - 1 \text{ when } \left(T_{class_{N_{class}-1}} \leq \text{info}_{sample}\right)$$

where $0 \leq \text{index}_{sample} < N_{class}$ and $\text{info}_{sample}$ stands for the corresponding edge strength measurement information.

Figure 7A:
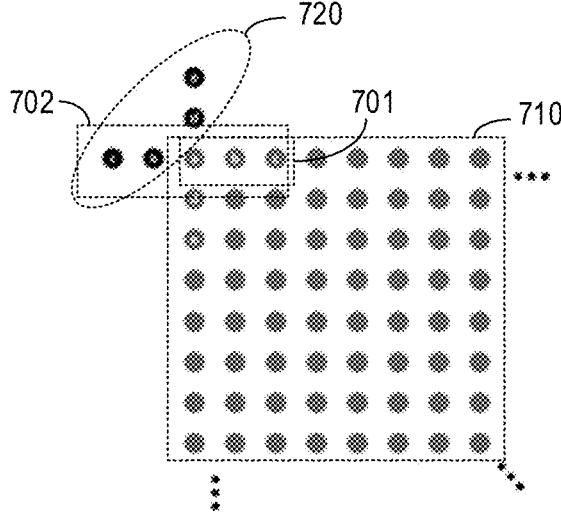
FIGS. 7A and 7B are schematic diagrams illustrating padding for boundary samples in accordance with some embodiments of the present disclosure, respectively.
Figure 7B:
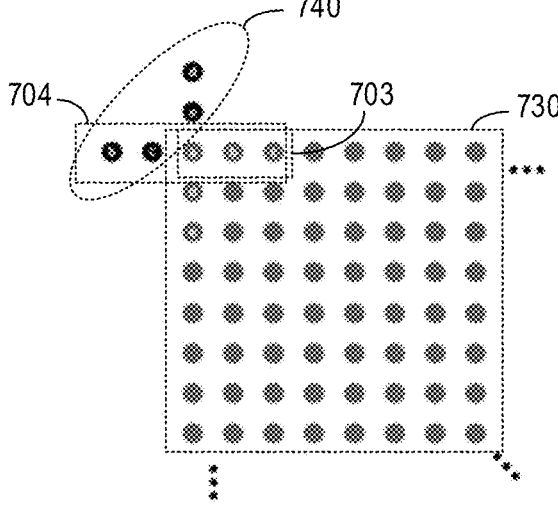

6) On filter matching
  a. In one example, the USM architecture may be used in the refinement/sharpness enhancement process. In a formulation way, the USM architecture could be described as follows:

$$\hat{f} = g + \lambda \times \mathcal{HF}\{g\}$$

where $\mathcal{HF}\{\bullet\}$ stands for the high frequency content of the input video unit and $\hat{f}$ stands for the updated video unit.
    i. In one example, the high frequency content of a video unit may be generated by a high-pass filter directly.
      a) In one example, the high-pass filter may be the Laplacian operator.
      b) In one example, the high-pass filter may be the Sobel operator.
      c) In one example, the high-pass filter may be the Isotropic operator.
      d) In one example, the high-pass filter may be the Prewitt operator.
      e) Alternatively, the high-pass filter may be any other high-pass filters.
    ii. In one example, the high frequency content of a video unit may be generated by a low-pass filter and corresponding input samples.
      a) In one example, the high frequency content of a video unit may be computed based on the difference between the input content and corresponding low-frequency content as follows:

$$\mathcal{H}\{g[m, n]\} = g[m, n] - \mathcal{L}\{g[m, n]\}$$

where $g[m,n]$ stands for an input sample at position $[m,n]$, $\mathcal{H}\{\bullet\}$ and $\mathcal{L}\{\bullet\}$ stand for high-frequency and low-frequency content respectively.
      a. In one example, the low-pass filter may be the Gaussian operator.
      b. In one example, the low-pass filter may be the Bilateral filter.
      c. In one example, the low-pass filter may be the Guided filter.
      d. In one example, the low-pass filter may be any other low-pass filters.
    iii. In one example, for generating the high-frequency content of an input video unit though a selected high-pass or low-pass filter, the corresponding parameters used for each class may be individual.
    iv. Alternatively, for generating the high-frequency content of an input video unit though a selected high-pass or low-pass filter, the corresponding parameters used for each class may be uniform.
    v. In one example, the parameters used in a selected high-pass or low-pass filter may be pre-trained, pre-defined or determined on-the-fly.
    vi. In one example, a set of weight $$\left[\lambda_{class_1}, \lambda_{class_2}, \cdots, \lambda_{class_{N_{class}-1}}\right]$$

may be used for enhancing high-frequency content of the input video unit.
    vii. Alternatively, a fixed weight $\lambda_{fixed}$ may be used for enhancing high-frequency content of the input video unit for different sample classes.
    viii. In one example, the weight used for enhancing high-frequency content of the input video unit may be pre-trained, pre-defined or determined on-the-fly.
  b. In one example, other image/video restoration architecture may be used in refinement/sharpness enhancement.
7) On padding for boundary samples
  a. In one example, a video unit may be padded before/ or after the refinement/sharpness enhancement process.
  b. In one example, whether to pad and/or how to pad the samples/pixels may depend on whether the neighbouring samples/pixels have been upscaled initially.
  c. In one example, when the neighbouring samples/ pixels have been upscaled initially, the neighbouring samples/pixels may be padded using the upscaled samples/pixels.
  d. Alternatively, when the neighbouring samples/pixels have not been upscaled, a pre-defined value may be used to pad.
  e. In one example, the extending and/or mirroring padding may be used, in which the padding samples/ pixels are not from neighbouring samples/pixels, but current video unit.
  f. In one example, the boundary samples of the video unit may be padded by a mirroring function.
    i. For instance, suppose that boundary samples are [a, b, c], the padded samples may be [c, b, a, b, c] as shown in FIG. 7A.
  g. In one example, the boundary sample of the video unit may be padded by extending function.
    i. For instance, suppose that boundary samples are [a, b, c], the padded samples may be [b, c, a, b, c] as shown in FIG. 7B.
  h. In one example, the padded samples/pixels may be used in the proposed filtering process.
  i. In one example, the updated samples/pixels by the refinement/sharpness enhancement may be used for padding samples/pixels.
8) On enabling/disabling filtering
  a. Whether to skip filtering some pixels/samples may be determined according to the MASK information.
  b. Whether to skip filtering some pixels/samples may be determined according to the decoded information from a video codec.
9) On multiple scale factor
  a. Several upscale ratios share one set of parameters and weights that used in refinement/sharpness enhancement process.

i. In one example, totally M (e.g., M=10) scale models are trained/maintained to cover almost all commonly used scale ratios.

a) In one example, the parameters and weights that trained for upscale ratio of 1/k (e.g., k=0.1) which is the greatest ratio in M is used by cases with upscale ratio in $$\left[\frac{1}{k+0.05}, \infty\right).$$

b) In one example, the model trained for upscale ratio of 1/p (e.g., p=0.9) that is the least ratio in M is used by cases with upscale ratio in $$\left(1, \frac{1}{p-0.05}\right).$$

c) In one example, the model that trained for upscale ratio 1/q (e.g., q=0.5) will be used by case with upscale ratio in $$\left[\frac{1}{q+0.05}, \frac{1}{q-0.05}\right).$$

ii. In one example, the input video unit is scaled horizontally and vertically independently when the horizontal/vertical scale factors are different.

iii. In one example, the input video unit is enhanced horizontally and vertically independently when the horizontal/vertical scale factors are different.

10) On parallel processing.

i. In one example, the input video unit may be divided into multiple non-overlapped slices, and each slice is processed individually without referencing any samples in any other slices.

ii. Alternatively, the input video unit may be divided into multiple non-overlapped regions, and each region is processed individually but referencing samples in other regions.

11) The decoded information may be utilized in the upsampling and enhancement process to determine filter information (including but not limited to parameters used in high-frequency content generation, weights used in refinement/sharpness enhancement and et. al) and/or on/off of filters:

a. On decoded information i. In one example, the decoded information may be the reusage flag of copying previously reconstructed frame in the decoded bit streams.

ii. In one example, the decoded information may be the reference frame information in the decoded bit streams.

iii. In one example, the decoded information may be the block segmentation information in the decoded bit streams.

iv. In one example, the decoded information may be the skip-mode flag information in IBC mode or inter mode in the decoded bit streams.

v. In one example, the decoded information may be the MV or BV information in IBC mode or inter mode in the decoded bit streams.

vi. In one example, the decoded information may be the CBF information in the decoded bit streams.

b. Frame level decision for skipping upsampling process and/or enhancement process i. In one example, whole-frame level upsampling process and/or enhancement process may be skipped.

a) In one example, the previously processed frame will be reused and the upsampling process and/or enhancement process of current frame will be skipped.

a. Alternatively, furthermore, when the reusage flag of copying previously reconstructed frame for the current frame is equal to 1, the above method may be applied.

b) In one example, the reused up-sampled frame is selected according to the corresponding reference frame information of current frame.

c. Block-level decision for skipping upsampling and/or enhancement process.

i. In one example, the input frame could be segmented into video units and each video unit may be adaptively determined whether to and/or how to apply upsampling process and/or enhancement process.

a) In one example, the determination may be according to the video unit segmentation information from the decoded bit streams.

b) In one example, for a video unit, if it is determined to skip the upsampling process and/or enhancement process, the output version of the video unit may be derived from previously processed video unit (in current frame or other frames).

c) In one example, the previously processed video unit may be reused and the upsampling process and/or enhancement process of current video unit may be skipped when the skip-mode flag of current video unit is equal to 1.

d) In one example, the previously processed video unit may be reused and the upsampling process and/or enhancement process of current video unit may be skipped when the CBF of current video unit is equal to 0.

e) In one example, the reused upscaled block is selected according to the corresponding MV or BV information and reference frame information.

Figure 8A:
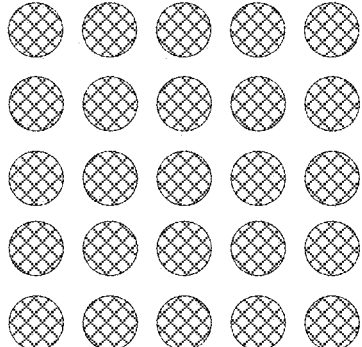
FIGS. 8A-8C are schematic diagrams illustrating filter shapes in accordance with some embodiments of the present disclosure, respectively.
Figure 8B:
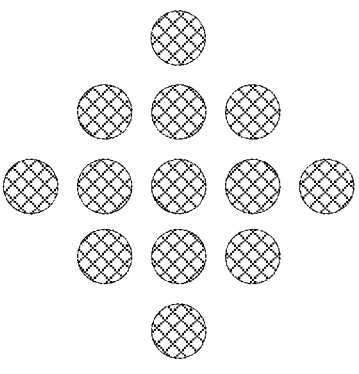
Figure 8C:
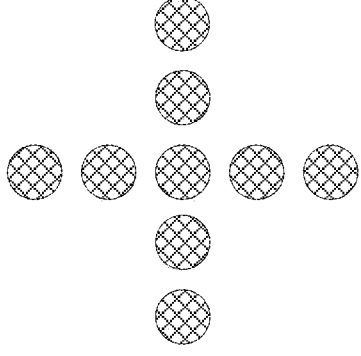

12) On filter shape:

a. In one example, the filter shape may be a square.

i. For instance, the squared filter shape may be as shown in FIG. 8A.

b. In one example, the filter shape may be a diamond.

i. For instance, the diamond filter shape may be as shown in FIG. 8B.

c. In one example, the filter shape may be a cross.

i. For instance, the crossed filter shape may be as shown in FIG. 8C.

d. In one example, the filter shape may be symmetrical.

e. In one example, the filter shape may be asymmetrical.

13) On blending with initial interpolation upscaling a. The upscaled and enhanced video unit may be blended with the initial upscaled video unit.

i. In one example, smooth region defined by the smooth detection method (e.g., Census Transform) in the processed video unit may be blended with the initial upscaled video unit.

14) On filtering
    a. In one example, filtering is performed in M*N samples/pixels basis, that is the same filter coefficients are applied to the M*N samples.

15) The proposed methods may be used in the decoding process, wherein the upscaled version may be utilized to predict other pictures to be decoded.
    a. In one example, a decoded frame may be firstly upscaled, and then utilized.

16) The proposed methods may be used in the decoding process, wherein the upscaled version of a sub-region within a frame may be utilized to predict other regions to be decoded.
    a. In one example, an indicator of a sub-region may be signaled.
        i. In one example, the sub-region may be defined as a CTB/CTU/a pre-defined size.

Figure 9:
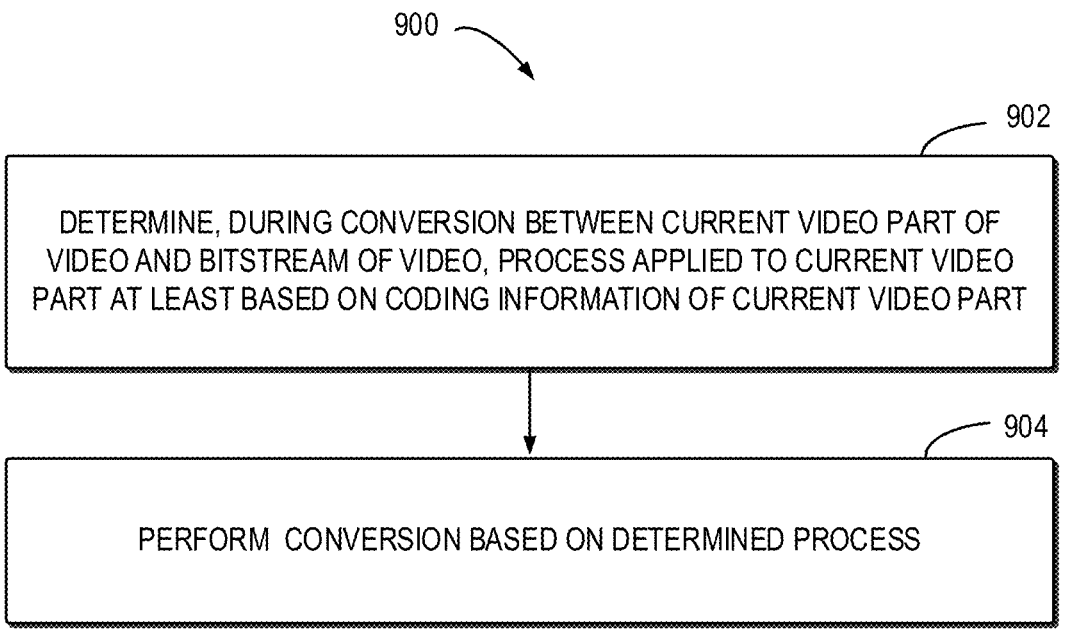
FIG. 9 illustrates a flowchart of a method for video processing in accordance with some embodiments of the present disclosure.

FIG. 9 illustrates a flowchart of a method 900 for video processing in accordance with some embodiments of the present disclosure. As shown in FIG. 9, the method 900 comprises: determining 902, during a conversion between a current video part of a video and a bitstream of the video, a process applied to the current video part at least based on coding information of the current video part, the determined process comprises at least one of an upsampling process or an enhancement process; and performing 904 the conversion based on the determined process.

According to the method 900, whether to or how to perform an upsampling process and/or an enhancement or a video part may depend on the coding information of the video part. Therefore, the visual quality based on the proposed solution is enhanced. Compared with the conventional solution, the method 900 in accordance with embodiments of the present disclosure can advantageously improve the coding efficiency and an image/video of larger size with more pixels and better visual quality is achieved.

In some embodiments, the term "the current video part" used hereinafter may refer to a current video unit of the video or a current frame of the video.

In some embodiments, the coding information comprises at least one coded information or decoded information.

In some embodiments, the decoded information may be utilized for determining filter information for a filtering process to be performed in the upsampling process and/or the enhancement process. In some embodiments, the decoded information may be utilized for determining controlling information of filters used in the filtering process. For example, the controlling information indicating whether the filters are on or off.

In some embodiments, the filter information comprises at least one of parameters used in high-frequency content generation or at least one target weight used for the filtering process.

In some embodiments, the decoded information comprises at least one of reusage flag of copying a previously reconstructed frame in a decoded bitstreams, reference frame information in the decoded bit streams, block segmentation information in the decoded bit streams, skip-mode flag information in intra block copy (IBC) mode or inter mode in the decoded bit streams, a motion vector (MV) or a binary vector (BV) information in IBC mode or inter mode in the decoded bit streams, or coded block flag (CBF) information in the decoded bit streams.

In some embodiments, in a case where the current video part is a current frame of the video, whole-frame level upsampling process and/or enhancement process may be skipped.

In some embodiments, a previously processed frame associated with the current frame is reused, and the upsampling process and/or enhancement process of the current frame is skipped. Alternatively, if the reusage flag of copying previously reconstructed frame for the current frame is equal to 1, the above method may be applied.

In some embodiments, the previously processed frame may be selected according to corresponding reference frame information of the current frame.

In some embodiments, in a case where the current video part is a current video unit of the video, whether the upsampling process and/or the enhancement process may be applied to the current video unit is determined based on segmentation information of the current video unit obtained from decoded bit streams.

In some embodiments, the determination may be according to the video unit segmentation information from the decoded bit streams.

In some embodiments, for the current video unit, if it is determined to skip the upsampling process and/or enhancement process, the output version of the current video unit may be derived from previously processed video unit, which may be in the current frame or other frames.

In some embodiments, the previously processed video unit may be reused and the upsampling process and/or enhancement process of current video unit may be skipped if the skip-mode flag of current video unit is equal to a predefined flag value. For example, the predefined flag value may be equal to 1.

In some embodiments, the previously processed video unit may be reused and the upsampling process and/or enhancement process of current video unit may be skipped if the CBF of current video unit is equal to a predefined flag value. For example, the predefined flag value may be equal to 0.

In some embodiments, a reused upscaled block is selected according to the corresponding MV or BV information and reference frame information.

In some embodiments, for samples within a given region, such as the current video part, whether to apply an enhancement process may be determined on-the-fly, for example, based on a mask. In some embodiments, the enhancement process comprises a refinement process and/or a sharpness process. For example, the refinement process may refer to additional refinement to upsampled sample values.

In some embodiments, the determination may be dependent on coding information, such as coded and/or decoded information. For example, if it is determined that a skip mode is allowed to be applied or there are non-zero transform coefficients in the coding information, the enhancement process may be skipped.

In some embodiments, the determination may be dependent on the sample values associated with the current video part before upsampling or after upsampling. For example, the sample values are values of current samples located within a predetermined window in the current video part.

In some embodiments, the enhancement process may be achieved based on n unsharp masking (USM) architecture while multiple modifications to each step in the USM process may be applied. For example, FIG. 6 shows an example of the enhancement process.

In general, based on the example shown in FIG. 6, the embodiments of the present disclosure may utilize an initial interpolation method to generate a high-resolution image/video and further enhances the high-resolution image/video by a refinement/sharpness enhancement scheme. The refinement/sharpness enhancement scheme uses a low-pass or high-pass filter to generate the high-frequency content and utilizes a weight to enhance the high-frequency content in the high-resolution image/video. Specifically, the scheme classifies the input pixel/sample into multiple groups/classes and utilizes a training dataset which contains degraded image and original ground truth image pairs to learn a specific weight/parameter for each group/class. The solution of the present disclosure may produce a high-resolution sharpness enhanced image/video with more details and less artifacts when input a low-resolution image/video.

In some embodiments, the current video part may be obtained from high-resolution image or high-resolution image video generated by an initial interpolation process.

In some embodiments, a Lanczos interpolation may be used for initial upsampling. In some embodiments, other interpolation method such as the bicubic algorithm, the bilinear algorithm, the nearest-neighbor interpolation algorithm may also be used. It is to be understood that other linear or non-linear super resolution methods may be used for initial upsampling.

In some embodiments, for a current video unit, horizontal and/or vertical gradients for the current video unit are calculated in the gradient initialization process. Alternatively, diagonal gradients, such as 45-degree and/or 135-degree, may also be calculated in the gradient initialization process. For example, the 45-degree gradient is defined as a sum of the difference between the current video unit and its corresponding right-top video unit and the difference between the current video unit and its corresponding left-bottom video unit. For example, the 135-degree gradient is defined as a sum of the difference between the current video unit and its corresponding left-top video unit and the difference between the current video unit and its corresponding right-bottom video unit.

For example, if the current video unit contains M*N sample/pixels and M and N are integers, M and N are both equal to 1. Alternatively, either M or N is greater than 1.

Furthermore, in some embodiments, for each video unit, gradient information of each samples/pixels within the video unit may be calculated and used.

Furthermore, for each video unit, gradient information of selective part of samples/pixels, such as K samples/pixels (K<M*N) within the video unit may be calculated and used.

In some embodiments, gradient information for each sample/pixel within the selective part of samples/pixels, such as K samples/pixels (K<M*N), which may be denoted by tempG, may be firstly calculated and final gradient information for the video unit may be based on the calculated tempG, e.g., averaged sum of tempG.

In some embodiments, the gradient information of samples which are out of picture boundary are calculated by padding the boundary samples. As an option, the boundary samples of the video unit may be padded by a mirroring function. As another option, the boundary samples of the video unit may be padded by an extending function.

For example, on padding for boundary samples, a video unit may be padded before/or after the refinement/sharpness enhancement process.

In some embodiments, whether to pad and/or how to pad the samples/pixels may depend on whether the neighbouring samples/pixels have been upscaled initially. For example, if the neighbouring samples/pixels have been upscaled initially, the neighbouring samples/pixels may be padded using the upscaled samples/pixels. Alternatively, if the neighbouring samples/pixels have not been upscaled, a pre-defined value may be used to pad.

In some embodiments, the extending and/or mirroring padding may be used, in which the padding samples/pixels are not from neighbouring samples/pixels, but current video unit.

As shown in FIG. 7A, the boundary samples of the video unit may be padded by a mirroring function. For instance, suppose that boundary samples are [a, b, c], which is indicated in the region 701 in FIG. 7A, the padded samples may be [c, b, a, b, c], which are indicated in the region 702 in FIG. 7A. In FIG. 7A, samples/pixels in the region 710 may be included in the current video unit while samples/pixels in the region 720 may be padded samples/pixels.

As shown in FIG. 7B, the boundary sample of the video unit may be padded by extending function. For instance, suppose that boundary samples are [a, b, c], which are indicated in the region 703 in FIG. 7B., the padded samples may be [b, c, a, b, c], which are indicated in the region 704 in FIG. 7B. In FIG. 7B, samples/pixels in the region 730 may be included in the current video unit while samples/pixels in the region 740 may be padded samples/pixels.

In some embodiments, the gradients of each video units may be further refined, such as using the average of gradient information directly. For example, the average of gradients for each direction (e.g., hor/ver/diagonal) for all video units within a sub-region, for example, with a dimension K*L, is calculated and used as the refined gradient for all samples within the sub-region.

It is to be understood that at least one of M, N, X, Y, K, L and T used hereinafter may be pre-defined or adaptively changed, for example, according to scaling factors/resolution/decoded information, or signaled.

In some embodiments, a MASK generation process is invoked for the enhancement by using based on the gradients of a current video unit. The gradients of a current video unit used herein may refer to initialized gradients of a current video unit or refined gradients of a current video unit. For example, the current video unit may contain one or multiple samples/pixels.

In some embodiments, for a processing unit in the MASK generation process, the same mask value is shared for samples/pixels contained in the processing unit. For example, the processing unit may comprise X*Y sample/pixels. As an option, a mask value is calculated once for the processing unit. As another option, the mask is defined as below. For example, the mask value is set to 1 if both diagonal gradients are less than a threshold value T, the mask value is set to 1 if both horizontal and vertical gradients are less than a threshold value T, and Otherwise, the mask value is set to 0.

In some embodiments, the processing unit is the same as the video unit for gradient calculation, i.e., X=M, and Y=N.

In some embodiments, the processing unit is greater than the video unit for gradient calculation, i.e., X*Y>M*N. For example, a mask value is calculated once for the processing unit. Alternatively, the mask is calculated based on gradients of one or multiple video units.

In some embodiments, the MASK may be derived according to the coded/decoded information, e.g., whether the block is coded with skip mode, or whether there are no non-zero transform coefficients.

In some embodiments, the MASK information may be utilized to determine whether to perform the refinement/sharpness enhancement process or not.

Furthermore, for the samples in the current video part, such as a current video unit, samples inside the current video unit may be classified into $N_{class}$ classes (e.g., $N_{class}=64$).

In some embodiments, samples inside the current video unit may be classified into multiple classes by an edge strength measurement method. For example, the edge strength measurement method may be the LoG operator, the DoG operator a gradient-based operator and/or an edge detection method.

In some embodiments, a fixed threshold value $T_{class}$ may be used to compute the class index of the sample based on LoG value, DoG value or other edge strength measurement methods as follows:

$$\text{index}_{sample} = \lfloor info_{sample} / T_{class} \rfloor$$

where $0 \leq \text{index}_{sample} < N_{class}$, $info_{sample}$ represents corresponding information for the edge strength measurement.

In some embodiments, a set of threshold value $$\left[ T_{class_1}, T_{class_2}, \dots, T_{class_{N_{class}-1}} \right]$$

may be used to classify the samples inside a video unit based on LoG value, DoG value or other edge strength measurement methods as follows:

$$\text{index}_{sampe} = 0 \ \text{when} \left( 0 \leq info_{sample} < T_{class_1} \right)$$

$$\text{index}_{sample} = 1 \ \text{when} \left( T_{class_1} \leq info_{sample} < T_{class_2} \right)$$

$$\dots$$

$$\text{index}_{sample} = N_{class} - 2 \ \text{when} \left( T_{class_{N_{class}-2}} \leq info_{sample} < T_{class_{N_{class}-1}} \right)$$

$$\text{index}_{sample} = N_{class} - 1 \ \text{when} \left( T_{class_{N_{class}-1}} \leq info_{sample} \right)$$

where $0 \leq \text{index}_{sample} < N_{class}$ and $info_{sample}$ stands for the corresponding edge strength measurement information.

As described above, the USM architecture may be used in the refinement/sharpness enhancement process. Specifically, if the enhancement process is to be applied to the current video part, the high-frequency content may be obtained by filtering the current video part with a low-pass filter or high-pass filter. Furthermore, at least one target weight may be determined for the high-frequency content and the enhancement process may be performed by enhancing the high-frequency content based on the at least one target weight.

In a formulation way, the USM architecture could be described as follows:

$$\hat{f} = g + \lambda \times \mathcal{HF}\{g\}$$

where $\mathcal{HF}\{\bullet\}$ represents the high frequency content of the input video unit and $\hat{f}$ represents the updated video unit, g represents a current sample in the current video part, and $\lambda$ represents the at least one target weight for the high-frequency content.

In some embodiments, the high frequency content of a video unit may be generated by a high-pass filter directly. For example, the high-pass filter may be the Laplacian operator, the Sobel operator, the Isotropic operator or the Prewitt operator. It is to be understood that the high-pass filter may also be any other high-pass filters.

In some embodiments, the high frequency content of a video unit may be generated by a low-pass filter and corresponding input samples. For example, the high frequency content of a video unit may be computed based on the difference between the input content and corresponding low-frequency content as follows:

$$\mathcal{H}\{g[m, n]\} = g[m, n] - \mathcal{L}\{g[m, n]\}$$

where g[m,n] stands for an input sample at position [m,n], $\mathcal{H}\{\bullet\}$ and $\mathcal{L}\{\bullet\}$ stand for high-frequency and low-frequency content respectively.

In some embodiments, the low-pass filter may be the Gaussian operator, the Bilateral filter, the Guided filter, or any other low-pass filters.

In some embodiments, for generating the high-frequency content of an input video unit though a selected high-pass or low-pass filter, the corresponding parameters used for each class may be individual.

Alternatively, for generating the high-frequency content of an input video unit though a selected high-pass or low-pass filter, the corresponding parameters used for each class may be uniform.

In some embodiments, the parameters used in a selected high-pass or low-pass filter may be pre-trained, pre-defined or determined on-the-fly.

In some embodiments, a set of weight $$\left[ \lambda_{class_1}, \lambda_{class_2}, \dots, \lambda_{class_{N_{class}-1}} \right]$$

may be used for enhancing high-frequency content of the input video unit.

Alternatively, a fixed weight $\lambda_{fixed}$ may be used for enhancing high-frequency content of the input video unit for different sample classes.

In some embodiments, the weight used for enhancing high-frequency content of the input video unit may be pre-trained, pre-defined or determined on-the-fly.

Furthermore, it is to be understood that other image/video restoration architecture may be used in refinement/sharpness enhancement.

In some embodiments, the padded samples/pixels, as described above, may also be used in the proposed filtering process.

In embodiments, the updated samples/pixels obtained by the refinement/sharpness enhancement may also be used for padding samples/pixels.

In some embodiments, in the filtering process, whether to skip filtering some pixels/samples, for example within the current video part, may be determined according to the MASK information.

In some embodiments, in the filtering process, whether to skip filtering some pixels/samples, for example within the current video part, may be determined according to the decoded information from a video codec.

In the enhancement process, multiple scale factors for the current video part may also be considered. For example, several upscale ratios share one set of parameters and weights that used in refinement/sharpness enhancement process.

In some embodiments, totally M (e.g., M=10) scale models may be trained/maintained to cover almost all commonly used scale ratios. For example, the parameters and weights that trained for upscale ratio of 1/k (e.g., k=0.1) which is the greatest ratio in M is used by cases with upscale ratio in $$\left[\frac{1}{k+0.05}, \infty\right).$$

Alternatively, or furthermore, the model trained for upscale ratio of 1/p (e.g., p=0.9) that is the least ratio in M is used by cases with upscale ratio in $$\left(1, \frac{1}{p-0.05}\right).$$

It is also possible that the model that trained for upscale ratio 1/q (e.g., q=0.5) will be used by case with upscale ratio in $$\left[\frac{1}{q+0.05}, \frac{1}{q-0.05}\right).$$

In some embodiments, the input video unit, such as the current video unit, is scaled horizontally and vertically independently when the horizontal/vertical scale factors are different.

In some embodiments, the input video unit, such as the current video unit, is enhanced horizontally and vertically independently when the horizontal/vertical scale factors are different.

Furthermore, in the enhancement process, the input video unit, such as the current video unit, may be divided into multiple non-overlapped slices, and each slice is processed individually without referencing any samples in any other slices. Alternatively, the input video unit, such as the current video unit, may be divided into multiple non-overlapped regions, and each region is processed individually but referencing samples in other regions.

In some embodiments, in the filtering process, different filter shapes may be used. In some embodiments, the filter shape may be a square, which is shown in FIG. 8A. Alternatively, the filter shape may be a diamond, which is shown in FIG. 8B. Moreover, the filter shape may be a cross, which is shown in FIG. 8C.

In some embodiments, the filter shape may be symmetrical or asymmetrical.

In some embodiments, in the enhancement process, especially on blending with initial interpolation upscaling, the upscaled and enhanced video unit may be blended with the initial upscaled video unit. For example, smooth region defined by the smooth detection method (e.g., Census Transform) in the processed video unit may be blended with the initial upscaled video unit.

In some embodiments, in the filtering process, filtering may be performed in M*N samples/pixels basis, that is the same filter coefficients are applied to the M*N samples.

In some embodiments, the solution of the present disclosure, as described above, may be used in the decoding process, wherein the upscaled version may be utilized to predict other pictures to be decoded. For example, a decoded frame may be firstly upscaled, and then utilized.

In some embodiments, the solution of the present disclosure, as described above, may be used in the decoding process, wherein the upscaled version of a sub-region within a frame may be utilized to predict other regions to be decoded. For example, an indicator of a sub-region may be signaled. In some embodiments, the sub-region may be defined as a Coding Tree Block (CTB), a Coding Tree Unit (CTU) or a pre-defined size.

In some embodiments, the conversion at 904 may comprise decoding the target picture from the bitstream of the video In some embodiments, the conversion at 904 may comprise encoding the target picture into the bitstream of the video.

Implementations of the present disclosure can be described in view of the following clauses, the features of which can be combined in any reasonable manner.

Clause 1. A method for video processing comprising determining, during a conversion between a current video part of a video and a bitstream of the video, a process applied to the current video part at least based on coding information of the current video part, the determined process comprises at least one of an upsampling process or an enhancement process; and performing the conversion based on the determined process.

Clause 2. The method of clause 1, wherein the coding information comprises at least one of coded information or decoded information.

Clause 3. The method of clause 2, wherein the decoded information is utilized for determining at least one of filter information for a filtering process to be performed in the at least one of the upsampling process and the enhancement process, or controlling information of filters used in the filtering process.

Clause 4. The method of clause 3, wherein the filter information comprises at least one of parameters used in high-frequency content generation or at least one target weight used for the filtering process.

Clause 5. The method of clause 3, wherein the controlling information indicating whether the filters are on or off.

Clause 6. The method of clause 2, wherein the decoded information comprises at least one of reusage flag of copying a previously reconstructed frame in a decoded bit-streams, reference frame information in the decoded bit streams, block segmentation information in the decoded bit streams, skip-mode flag information in intra block copy (IBC) mode or inter mode in the decoded bit streams, a motion vector (MV) or a binary vector (BV) information in IBC mode or inter mode in the decoded bit streams, or coded block flag (CBF) information in the decoded bit streams.

Clause 7. The method of clause 1, wherein the current video part is a current frame of the video, and the determined process which is a whole-frame level process is skipped.

Clause 8. The method of clause 7, wherein a previously processed frame associated with the current frame is reused, and the determined process is skipped.

Clause 9. The method of clause 7, wherein a reusage flag of copying the previously processed frame for the current frame is equal to 1.

Clause 10. The method of clause 8, wherein the previously processed frame is selected according to corresponding reference frame information of the current frame.

Clause 11. The method of clause 1, wherein the current video part is a current video unit of the video, and whether the at least one of the upsampling process and the enhancement process is applied to the current video unit is determined based on segmentation information of the current video unit obtained from decoded bit streams.

Clause 12. The method of clause 11, wherein if the at least one of the upsampling process and the enhancement process is determined to be skipped for the current video unit, an output version of the current video unit is derived from a previously processed video unit.

Clause 13. The method of clause 11, wherein if a skip-mode flag of the current video unit is equal to 1, the previously processed video unit is reused and the at least one of the upsampling process and the enhancement process is skipped.

Clause 14. The method of clause 11, wherein if coded block flag (CBF) of the current video unit is equal to 0, the previously processed video unit is reused and the at least one of the upsampling process and the enhancement process is skipped.

Clause 15. The method of clause 13 or 14, wherein a reused upscaled block is selected according to corresponding motion vector (MV) or binary vector (BV) information and reference frame information.

Clause 16. The method of clause 1, wherein the enhancement process comprises at least one of refinement process or a sharpness process.

Clause 17. The method of clause 1, wherein the enhancement process comprises at least one of refinement process or a sharpness process.

Clause 18. The method of clause 1, wherein whether the enhancement process is applied is determined based on the coding information.

Clause 19. The method of clause 1, wherein whether the enhancement process is applied is determined based on sample values associated with the current video part before or after the upsampling process.

Clause 20. The method of clause 19, wherein the sample values are values of current samples located within a predetermined window in the current video part.

Clause 21. The method of clause 1, wherein the current video part is obtained from high-resolution image or high-resolution image video generated by an initial interpolation process.

Clause 22. The method of clause 21, wherein the initial interpolation process comprises at least one of a Lanczos interpolation, a bicubic algorithm, a bilinear algorithm, or a nearest-neighbor interpolation algorithm.

Clause 23. The method of clause 1, wherein the current video part is a current video unit of the video, and a MASK generation process is performed for the enhancement process by utilizing gradients of the current video unit.

Clause 24. The method of clause 23, wherein a same mask value is shared for current samples of a process unit in the MASK generation process.

Clause 25. The method of clause 23, wherein a mask value is calculated once for a processing unit in the MASK generation process.

Clause 26. The method of clause 25, wherein if both diagonal gradients are less than a threshold value or both horizontal and vertical gradients are less than a threshold value, the shared mask value is set to a first mask value, and if both diagonal gradients are not less than the threshold value or both horizontal and vertical gradients are not less than the threshold value, the shared mask value is set to a second mask value.

Clause 27. The method of clause 26, wherein the first mask value is 1 and the second mask value is 0.

Clause 28. The method of clause 23, wherein a processing unit in the MASK generation process is the same as the current video unit.

Clause 29. The method of clause 23, wherein a processing unit in the MASK generation process is greater than the current video unit.

Clause 30. The method of clause 29, wherein a mask value is calculated once for the processing unit in the MASK generation process.

Clause 31. The method of clause 29, wherein a mask value is calculated based on gradients of one or more current video units.

Clause 32. The method of clause 23, wherein a mask generated in the MASK generation process is derived based on the coding information.

Clause 33. The method of clause 32, wherein whether the enhancement process is applied to the mask information obtained from the MASK generation process.

Clause 34. The method of clause 23, wherein the gradients of the current video unit are calculated in a gradient initialization process, and wherein the gradients of the current video unit comprise at least one of: horizontal gradients, vertical gradients, or diagonal gradients.

Clause 35. The method of clause 34, wherein the diagonal gradients comprise at least one of a 45-degree gradient or a 135-degree gradient, wherein the 45-degree gradient indicates that a sum of a first difference between the current video unit and a corresponding right-top video unit of the current video unit and a second difference between the current video unit and a corresponding left-bottom video unit of the current video unit.

Clause 36. The method of clause 34, wherein the current video unit comprises M*N samples or M*N pixels, wherein M and N are integers.

Clause 37. The method of clause 36, wherein M and N are both equal to 1.

Clause 38. The method of clause 36, wherein either M or N is greater than 1.

Clause 39. The method of clause 36, wherein each of M*N samples or M*N pixels are used for the calculating in the gradient initialization process.

Clause 40. The method of clause 36, wherein a part of M*N samples or M*N pixels are used for the calculating in the gradient initialization process.

Clause 41. The method of clause 40, wherein the gradients of the current video unit are obtained from initial gradient information calculated by the part of M*N samples or M*N pixels.

Clause 42. The method of clause 34, wherein gradients of one or more current samples located are out of a boundary of the current video unit are calculated by padding the one or more current samples.

Clause 43. The method of clause 42, wherein the one or more current samples are padded by a mirroring function or an extending function, in which one or more reference samples within the current video unit are used.

Clause 44. The method of clause 42, wherein the padding is performed before the enhancement process or after the enhancement process.

Clause 45. The method of clause 42, wherein if one or more neighbouring samples or pixels associated with the current video unit have been upscaled initially, the one or more neighbouring samples or pixels are allowed to be used for the padding.

Clause 46. The method of clause 42, wherein if one or more neighbouring samples or pixels associated with the current video unit have not been upscaled initially, a pre-defined value is allowed to be used for the padding.

Clause 47. The method of clause 34, wherein the gradients for the current video unit are further refined by using an average of gradients.

Clause 48. The method of clause 47, wherein the average of gradients for each direction in the current video unit within a pre-defined region is used as a refined gradient for all current samples with the pre-defined region.

Clause 49. The method of clause 1, wherein an unsharp masking (USM) architecture is used in the enhancement process.

Clause 50. The method of clause 1, wherein performing the conversion comprises: in accordance with a determination that the enhancement process is applied, obtaining high-frequency content by filtering the current video part with a low-pass filter or high-pass filter; determining at least one target weight for the high-frequency content; and performing the enhancement process by enhancing the high-frequency content based on the at least one target weight.

Clause 51. The method of clause 50, wherein the enhancement process is performed based on:

$$\hat{f} = g + \lambda \times \mathcal{HF}\{g\}$$

where $\mathcal{HF}\{\bullet\}$ represents the high frequency content, $\hat{f}$ represents an enhanced current sample, g represents a current sample in the current video part, and $\lambda$ represents the at least one target weight.

Clause 52. The method of clause 50, wherein the high frequency content is generated by a high-pass filter directly.

Clause 53. The method of clause 52, wherein the high-pass filter comprises at least one of a Laplacian operator, a Sobel operator, a Isotropic operator or a Prewitt operator.

Clause 54. The method of clause 50, wherein the high frequency content is generated by a low-pass filter.

Clause 55. The method of clause 54, wherein the current video part is a current video unit of the video, and wherein the high frequency content of the current video unit is computed based on a difference between an input content and corresponding low-frequency content.

Clause 56. The method of clause 55, wherein the high frequency content is computed based on $$\mathcal{H}\{g[m, n]\} = g[m, n] - \mathcal{L}\{g[m, n]\}$$

where g[m,n] represents as a current sample at position [m,n], $\mathcal{H}\{\bullet\}$ represents a high-frequency content and $\mathcal{L}\{\bullet\}$ represents as a low-frequency content.

Clause 57. The method of clause 54, wherein the low-pass filter comprises at least one of a Gaussian operator, a Bilateral filter or a Guided filter.

Clause 58. The method of clause 50, wherein the current video part is a current video unit of the video, and wherein for generating the high-frequency content of the current video unit though a selected high-pass or low-pass filter, corresponding parameters used for each class associated with current samples in the current video unit are individual.

Clause 59. The method of clause 58, wherein the corresponding parameters used in the high-pass filter or low-pass filter are pre-trained, pre-defined or determined on-the-fly.

Clause 60. The method of clause 50, wherein the at least one target weight indicates a set of weight values are used for enhancing high-frequency content.

Clause 61. The method of clause 50, wherein the at least one target weight indicates a fixed weight value is used for enhancing high-frequency content for different sample classes.

Clause 62. The method of clause 50, wherein the at least one weight used for enhancing high-frequency content is pre-trained, pre-defined or determined on-the-fly.

Clause 63. The method of clause 50, wherein determining at least one target weight for the high-frequency content comprises: classifying current samples in the current video part to a plurality of groups of current samples or a plurality of classes of current samples; learning respective weights for the plurality of groups of current samples or the plurality of classes of current samples based on a training dataset containing pairs of reference degraded samples and original reference samples; and determining the respective weights as at least one target weight.

Clause 64. The method of clause 63, wherein the current video part is a current video unit of the video, and wherein the current samples in the current video unit are classified into a first number of classes based on an edge strength measurement.

Clause 65. The method of clause 64, wherein the edge strength measurement comprises at least one of a Laplacian of Gaussian (LoG) operator, a Difference of Gaussian (DoG) operator, a gradient-based operator or an edge detection method.

Clause 66. The method of clause 64, wherein a fixed threshold value for the edge strength measurement is used to compute a class index of a current sample based on a LoG value or a DoG value or other edge strength measurement methods.

Clause 67. The method of clause 66, wherein the class index is computed based on:

$$\text{index}_{sample} = \lfloor info_{sample} / T_{class} \rfloor$$

where $0 \le \text{index}_{sample} < N_{class}$, $info_{sample}$ represents corresponding information for the edge strength measurement, $T_{class}$ represents the fixed threshold value and $N_{class}$ represents the first number.

Clause 68. The method of clause 64, wherein a set of threshold values are used to classify the current samples based on a LoG value, a DoG value or other edge strength measurement methods.

Clause 69. The method of clause 68, wherein the current samples are classified based on $$\text{index}_{sampe} = 0 \text{ when}(0 \le info_{sample} < T_{class_1})$$

$$\text{index}_{sample} = 1 \text{ when}(T_{class_1} \le info_{sample} < T_{class_2})$$

$$...$$

$$\text{index}_{sample} = N_{class} - 2 \text{ when}(T_{class_{N_{class}-2}} \le info_{sample} < T_{class_{N_{class}-1}})$$

$$\text{index}_{sample} = N_{class} - 1 \text{ when}(T_{class_{N_{class}-1}} \le info_{sample})$$

where $0 \leq index_{sample} < N_{class}$, info sample represents corresponding information for the edge strength measurement, $$\left[ T_{class_1}, T_{class_2}, \ldots, T_{class_{N_{class}-1}} \right]$$

represents the set of threshold values and $N_{class}$ represents the first number.

Clause 70. The method of clause 50, wherein a part of pixels/samples within the current video part are not to be filtered based on mask information or coding information.

Clause 71. The method of clause 50, wherein one or more padded samples are used for the filtering.

Clause 72. The method of clause 50, wherein the one or more padding samples are applied with the enhancement process.

Clause 73. The method of clause 50, wherein a shape for filtering the at least one current sample is a square, a diamond or a cross.

Clause 74. The method of clause 50, wherein a shape for filtering the at least one current sample is symmetrical or asymmetrical.

Clause 75. The method of clause 50, wherein the current video part comprises M*N samples or M*N pixels, and wherein same filter coefficients are applied to the M*N samples performed in the M*N samples or the M*N pixels.

Clause 76. The method of clause 50, wherein a set of parameters or weight used in the enhancement process are shared by a plurality of upscale ratios.

Clause 77. The method of clause 76, wherein a second number of scale models are trained or maintained to cover almost all commonly used scale ratios.

Clause 78. The method of clause 76, wherein the at least one target weight that trained for upscale ratio of 1/k which is the greatest ratio in plurality of upscale ratios is used by cases with upscale ratio in $$\left[ \frac{1}{k+0.05}, \infty \right).$$

Clause 79. The method of clause 76, wherein the at least one target weight that trained for 1/p that is the least ratio in the plurality of upscale ratios is used by cases with upscale ratio in $$\left( 1, \frac{1}{p-0.05} \right).$$

Clause 80. The method of clause 76, wherein the at least one target weight that trained for 1/q is used by case with upscale ratio in $$\left[ \frac{1}{q+0.05}, \frac{1}{q-0.05} \right).$$

Clause 81. The method of clause 76, wherein the current video part is a current video unit of the video, and wherein the current video unit is scaled horizontally and vertically independently if the horizontal or vertical scale factors are different.

Clause 82. The method of clause 1, wherein the determined process is used in a decoding process of the current video part, and wherein an upscaled version of the current video part is utilized to predict other pictures to be decoded.

Clause 83. The method of clause 1, wherein the determined process is used in a decoding process of the current video part, and wherein an upscaled version of the current video part is utilized to predict other pictures to be decoded.

Clause 84. The method of clause 83, wherein the current video part is a current frame of the video, and wherein a decoded current frame is firstly upscaled, and then utilized.

Clause 85. The method of clause 1, wherein the determined process is used in a decoding process of the current video part, and wherein an upscaled version of a sub-region within a current frame associated with the current video part is utilized to predict other regions to be decoded.

Clause 86. The method of clause 85, wherein an indicator of the sub-region is obtained.

Clause 87. The method of clause 85, wherein the sub-region is defined as a Coding Tree Block (CTB), a Coding Tree Unit (CTU) or a pre-defined size.

Clause 88. The method of clause 1, wherein the current video part is a current video unit of the video, and wherein if the enhancement process is applied to the current video unit, an enhance reference video unit is allowed to be blended with the current video unit.

Clause 89. The method of clause 1, wherein the current video part is a current video unit of the video, and wherein the current video unit is divided into a plurality of non-overlapped slices, and each slice of the plurality of non-overlapped slices is processed individually without referencing samples in other slices or referencing samples in other regions.

Clause 90. The method of any of clauses 1-89, wherein the conversion comprises decoding the current video part from the bitstream of the video.

Clause 91. The method of any of clauses 1-89, wherein the conversion comprises encoding the current video part into the bitstream of the video.

Clause 92. An apparatus for processing video data comprising a processor and a non-transitory memory with instructions thereon, wherein the instructions upon execution by the processor, cause the processor to perform a method in accordance with any of clauses 1-91.

Clause 93. A non-transitory computer-readable storage medium storing instructions that cause a processor to perform a method in accordance with any of clauses 1-91.

Clause 94. A non-transitory computer-readable recording medium storing a bitstream of a video which is generated by a method performed by a video processing apparatus, wherein the method comprises: determining a process applied to a current video part of the video at least based on coding information of the current video part, the determined process comprises at least one of an upsampling process or an enhancement process; and generating the bitstream based on the determined process.

Clause 95. A method for storing bitstream of a video, comprising: determining a process applied to a current video part of the video at least based on coding information of the current video part, the determined process comprises at least one of an upsampling process or an enhancement process; generating the bitstream based on the determined process; and storing the bitstream in a non-transitory computer-readable recording medium.

Example Device

Figure 10:
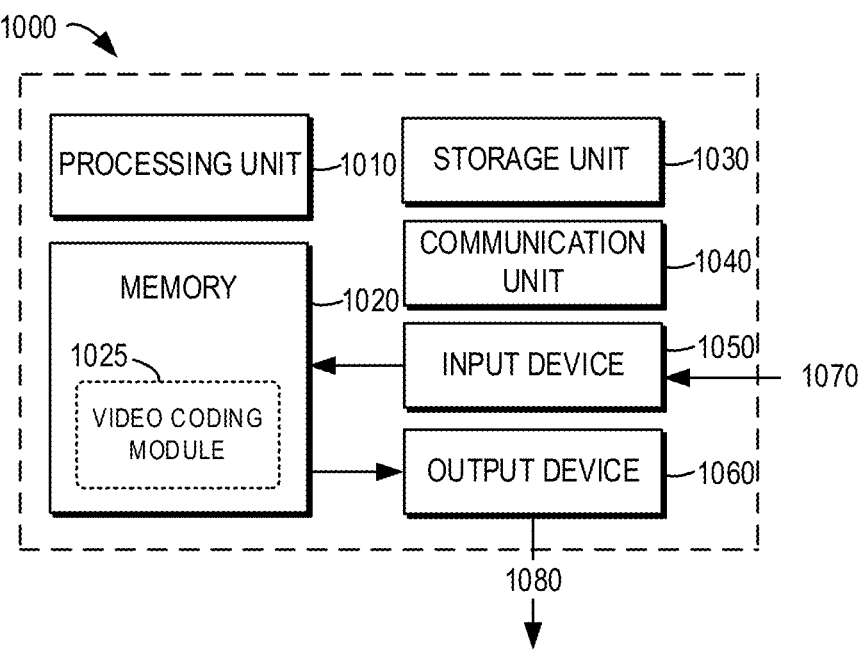
FIG. 10 illustrates a block diagram of a computing device in which various embodiments of the present disclosure can be implemented.

FIG. 10 illustrates a block diagram of a computing device 1000 in which various embodiments of the present disclosure can be implemented. The computing device 1000 may be implemented as or included in the source device 110 (or the video encoder 114 or 200) or the destination device 120 (or the video decoder 124 or 300).

It would be appreciated that the computing device 1000 shown in FIG. 10 is merely for purpose of illustration, without suggesting any limitation to the functions and scopes of the embodiments of the present disclosure in any manner.

As shown in FIG. 10, the computing device 1000 includes a general-purpose computing device 1000. The computing device 1000 may at least comprise one or more processors or processing units 1010, a memory 1020, a storage unit 1030, one or more communication units 1040, one or more input devices 1050, and one or more output devices 1060.

In some embodiments, the computing device 1000 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1000 can support any type of interface to a user (such as "wearable" circuitry and the like).

The processing unit 1010 may be a physical or virtual processor and can implement various processes based on programs stored in the memory 1020. In a multi-processor system, multiple processing units execute computer executable instructions in parallel so as to improve the parallel processing capability of the computing device 1000. The processing unit 1010 may also be referred to as a central processing unit (CPU), a microprocessor, a controller or a microcontroller.

The computing device 1000 typically includes various computer storage medium. Such medium can be any medium accessible by the computing device 1000, including, but not limited to, volatile and non-volatile medium, or detachable and non-detachable medium. The memory 1020 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1030 may be any detachable or non-detachable medium and may include a machine-readable medium such as a memory, flash memory drive, magnetic disk or another other media, which can be used for storing information and/or data and can be accessed in the computing device 1000.

The computing device 1000 may further include additional detachable/non-detachable, volatile/non-volatile memory medium. Although not shown in FIG. 10, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1040 communicates with a further computing device via the communication medium. In addition, the functions of the components in the computing device 1000 can be implemented by a single computing cluster or multiple computing machines that can communicate via communication connections. Therefore, the computing device 1000 can operate in a networked environment using a logical connection with one or more other servers, networked personal computers (PCs) or further general network nodes.

The input device 1050 may be one or more of a variety of input devices, such as a mouse, keyboard, tracking ball, voice-input device, and the like. The output device 1060 may be one or more of a variety of output devices, such as a display, loudspeaker, printer, and the like. By means of the communication unit 1040, the computing device 1000 can further communicate with one or more external devices (not shown) such as the storage devices and display device, with one or more devices enabling the user to interact with the computing device 1000, or any devices (such as a network card, a modem and the like) enabling the computing device 1000 to communicate with one or more other computing devices, if required. Such communication can be performed via input/output (I/O) interfaces (not shown).

In some embodiments, instead of being integrated in a single device, some or all components of the computing device 1000 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1000 may be used to implement video encoding/decoding in embodiments of the present disclosure. The memory 1020 may include one or more video coding modules 1025 having one or more program instructions. These modules are accessible and executable by the processing unit 1010 to perform the functionalities of the various embodiments described herein.

In the example embodiments of performing video encoding, the input device 1050 may receive video data as an input 1070 to be encoded. The video data may be processed, for example, by the video coding module 1025, to generate an encoded bitstream. The encoded bitstream may be provided via the output device 1060 as an output 1080.

In the example embodiments of performing video decoding, the input device 1050 may receive an encoded bitstream as the input 1070. The encoded bitstream may be processed, for example, by the video coding module 1025, to generate decoded video data. The decoded video data may be provided via the output device 1060 as the output 1080.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

The invention claimed is:

1. A method for video processing, comprising:

determining, during a conversion between a current video part of a video and a bitstream of the video, a process applied to the current video part at least based on coding information of the current video part, the determined process comprises at least one of an upsampling process or an enhancement process; and performing the conversion based on the determined process, wherein if the current video part is a current frame of the video and the determined process which is a whole-frame level process is skipped, a previously processed frame associated with the current frame is allowed to be reused.

2. The method of claim 1, wherein the coding information comprises at least one of coded information or decoded information.

3. The method of claim 2, wherein the decoded information is utilized for determining at least one of:

filter information for a filtering process to be performed in the at least one of the upsampling process and the enhancement process, or controlling information of filters used in the filtering process, or wherein the decoded information comprises at least one of:

reusage flag of copying a previously reconstructed frame in a decoded bitstreams, reference frame information in the decoded bitstreams, block segmentation information in the decoded bitstreams, skip-mode flag information in intra block copy (IBC) mode or inter mode in the decoded bitstreams, a motion vector (MV) or a binary vector (BV) information in IBC mode or inter mode in the decoded bitstreams, or coded block flag (CBF) information in the decoded bitstreams.

4. The method of claim 3, wherein the filter information comprises at least one of parameters used in high-frequency content generation or at least one target weight used for the filtering process, or wherein the controlling information indicating whether the filters are on or off.

5. The method of claim 1 wherein if a reusage flag of copying the previously processed frame for the current frame is equal to 1, the previously processed frame associated with the current frame is reused.

6. The method of claim 5, wherein the previously processed frame is selected according to corresponding reference frame information of the current frame.

7. The method of claim 1, wherein the current video part is a current video unit of the video, and whether the at least one of the upsampling process and the enhancement process is applied to the current video unit is determined based on segmentation information of the current video unit obtained from decoded bit streams.

8. The method of claim 7, wherein if the at least one of the upsampling process and the enhancement process is determined to be skipped for the current video unit, an output version of the current video unit is derived from a previously processed video unit, or if a skip-mode flag of the current video unit is equal to 1, the previously processed video unit is reused and the at least one of the upsampling process and the enhancement process is skipped, or if coded block flag (CBF) of the current video unit is equal to 0, the previously processed video unit is reused and the at least one of the upsampling process and the enhancement process is skipped.

9. The method of claim 8, wherein a reused upscaled block is selected according to corresponding motion vector (MV) or binary vector (BV) information and reference frame information.

10. The method of claim 1, wherein the determined process is used in a decoding process of the current video part, and wherein an upscaled version of the current video part is utilized to predict other pictures to be decoded.

11. The method of claim 10, wherein the current video part is a current frame of the video, and wherein a decoded current frame is firstly upscaled, and then utilized.

12. The method of claim 1, wherein the determined process is used in a decoding process of the current video part, and wherein an upscaled version of a sub-region within a current frame associated with the current video part is utilized to predict other regions to be decoded.

13. The method of claim 12, wherein an indicator of the sub-region is obtained, or wherein the sub-region is defined as a Coding Tree Block (CTB), a Coding Tree Unit (CTU) or a pre-defined size.

14. The method of claim 1, wherein the current video part is obtained from high-resolution image or high-resolution image video generated by an initial interpolation process, and the initial interpolation process comprises at least one of:

a Lanczos interpolation, a bicubic algorithm, a bilinear algorithm, or a nearest-neighbor interpolation algorithm, or wherein the current video part is a current video unit of the video, and a MASK generation process is performed for the enhancement process by utilizing gradients of the current video unit.

15. The method of claim 14, wherein the gradients of the current video unit are calculated in a gradient initialization process, and wherein the gradients of the current video unit comprise at least one of:

horizontal gradients, vertical gradients, or diagonal gradients.

16. The method of claim 1, wherein an unsharp masking (USM) architecture is used in the enhancement process, or wherein performing the conversion comprises:

in accordance with a determination that the enhancement process is applied, obtaining high-frequency content by filtering the current video part with a low-pass filter or high-pass filter;

determining at least one target weight for the high-frequency content; and performing the enhancement process by enhancing the high-frequency content based on the at least one target weight, or wherein the current video part is a current video unit of the video, and wherein if the enhancement process is applied to the current video unit, an enhance reference video unit is allowed to be blended with the current video unit, or wherein the current video part is a current video unit of the video, and wherein the current video unit is divided into a plurality of non-overlapped slices, and each slice of the plurality of non-overlapped slices is processed individually without referencing samples in other slices or referencing samples in other regions.

17. The method of claim 1, wherein the conversion comprises decoding the current video part from the bitstream of the video, or wherein the conversion comprises encoding the current video part into the bitstream of the video.

18. An apparatus for processing video data comprising a processor and a non-transitory memory with instructions thereon, wherein the instructions upon execution by the processor, cause the processor to perform a method comprising:

determining, during a conversion between a current video part of a video and a bitstream of the video, a process applied to the current video part at least based on coding information of the current video part, the determined process comprises at least one of an upsampling process or an enhancement process; and performing the conversion based on the determined process, wherein if the current video part is a current frame of the video and the determined process which is a whole-frame level process is skipped, a previously processed frame associated with the current frame is allowed to be reused.

19. A non-transitory computer-readable storage medium storing instructions that cause a processor to perform a method comprising:

determining, during a conversion between a current video part of a video and a bitstream of the video, a process applied to the current video part at least based on coding information of the current video part, the determined process comprises at least one of an upsampling process or an enhancement process; and performing the conversion based on the determined process, wherein if the current video part is a current frame of the video and the determined process which is a whole-frame level process is skipped, a previously processed frame associated with the current frame is allowed to be reused.

20. The method of claim 1, further comprising:

storing the bitstream in a non-transitory computer-readable recording medium.

\* \* \* \* \*